(12) United States Patent
Climent et al.

(10) Patent No.: US 8,378,292 B1
(45) Date of Patent: Feb. 19, 2013

(54) NEUTRON POROSITY MEASUREMENT DEVICES WITH SEMICONDUCTOR NEUTRON DETECTION CELLS AND METHODS

(75) Inventors: Helene Claire Climent, Sugar Land, TX (US); Jason MacInnis, Sugar Land, TX (US)

(73) Assignee: Sondex Wireline Limited, Farnborough, Hampshire (GB)

( * ) Notice: Subject to any disclaimer, the term of this patent is extended or adjusted under 35 U.S.C. 154(b) by 24 days.

(21) Appl. No.: 13/193,252

(22) Filed: Jul. 28, 2011

(51) Int. Cl.
*G01V 5/04* (2006.01)
(52) U.S. Cl. ..................................... 250/265
(58) Field of Classification Search ............ 3/253–268, 3/269.1–269.8, 370.01–370.15, 392.01–390.12, 3/393
See application file for complete search history.

(56) References Cited

U.S. PATENT DOCUMENTS

| | | | |
|---|---|---|---|
| 3,942,004 A | 3/1976 | Kehler | |
| 4,005,290 A | 1/1977 | Allen | |
| 4,021,666 A | 5/1977 | Allen | |
| 5,196,698 A | 3/1993 | Schneider | |
| 6,781,115 B2 * | 8/2004 | Stoller et al. | 250/266 |
| 7,301,223 B2 | 11/2007 | Rodney et al. | |
| 7,793,712 B2 | 9/2010 | Yamate et al. | |

OTHER PUBLICATIONS

Rebecca J. Nikolic, et al., "Future of Semiconductor Based Thermal Neutron Detectors", UCRL-PROC-219274, Nanotech 2006, Boston, MA, United States, May 7-11, 2006, entire document, http://digitalcommons.unl.edu/chemistrycheung/14.

Rebecca J. Nikolic, et al., "Fabrication of Pillar-Structured Thermal Neutron Detectors", 2007 IEEE Nuclear Science Symposium Conference Record, "1-4244-0923-3/07," downloaded on Aug. 13, 2010, pp. 1577-1580, copyrighted 2007, IEEE.

Rebecca J. Nikolic, et al., "Pillar Structured Thermal Neutron Detector", "978-1-4244-2186-2/08," Lawrence Liverpool National Laboratories, entire document, copyrighted 2008, IEEE.

D. S. McGregor, et al., "Nuclear Instruments and Methods in a Physics Research A", Nucl. Instr. and Meth. A, (2009), doi:10.1016/j.nima.2009.06.031, pp. 1-7.

H. Climent, "Silicon Carbide Neutron Detectors Efficiency Modeling Study," GE Technical Report, pp. 1-11, Sep. 27, 2010.

S.L. Bellinger, et al., "Enhanced Variant Designs and Characteristics of the Microstructured Solid-State Neutron Detector," entire document, doi:10.1016/j.nima.2010.08.049, (2010).

S.L. Bellinger, et al. "Variant Designs and Characteristics of Improved Microstructured Solid-State Neutron Detectors," 2009 IEEE Nuclear Science Symposium Conference Record, pp. 986-989, (2009).

* cited by examiner

*Primary Examiner* — Kiho Kim
(74) *Attorney, Agent, or Firm* — Potomac Patent Group, PLLC

(57) ABSTRACT

A neutron porosity measurement device adapted to receive a neutron source configured to emit neutrons having a first energy includes a segmented semiconductor detector located at a predetermined distance from the neutron source. The segmented semiconductor detector includes a plurality of semiconductor neutron detection cells configured to detect neutrons having a second energy smaller than the first energy. The cells are arranged in subsets located between a first distance and a second distance from the neutron source, each subset including semiconductor neutron detection cells surrounding an axis and being disposed in opposite sectors defined relative to the axis at substantially same distance from the neutron source. One or more of the neutron detection cells are configured to acquire data related to detected neutrons independently from one or more other of the neutron detected cells. A method of manufacturing the neutron porosity measurement device is also provided.

20 Claims, 7 Drawing Sheets

NEUTRON POROSITY MEASUREMENT DEVICES WITH SEMICONDUCTOR NEUTRON DETECTION CELLS AND METHODS

BACKGROUND

1. Technical Field

Embodiments of the subject matter disclosed herein generally relate to neutron porosity measurement devices for oil and gas industry, more particularly, devices including plural semiconductor neutron detection cells arranged to allow gathering data with azimuth coverage and enabling evaluating porosity by considering different configurations.

2. Discussion of the Background

In the oil and gas industry, well logging (or borehole logging) is a term used for detail records made about geophysical properties of geological formations penetrated by a borehole. The records include results of various and sometimes complex measurements performed using tools lowered into the well or samples brought to the surface. Of particular interest are measurements of porosity, permeability and fluid content of the formations.

Porosity is the proportion of fluid-filled space found within the rock that may contain oil and gas, and is an indicator of the possible reserve of oil and gas. Logging tools configured to provide porosity measurements may employ various techniques (e.g., accoustics and Nuclear Magnetic Resonance), but using neutrons is the most frequently used method. The logging tools may have to operate at temperatures as high as 175° C. and sometimes even higher.

FIG. 1 is an axial cross section of a conventional down-hole porosity measurement set-up performed using a neutron source 10 and two detectors, a "near" neutron detector 20 and a "far" neutron detector 30, which are located at different distances from the neutron source 10. The neutron source 10 and the neutron detectors 20 and 30 are usually encapsulated in a chassis 40. The chassis 40 is lowered in a borehole 50 that penetrates a geological formation 60. Some of the neutrons emitted by the neutron source 10 towards the formation 60, loose energy (i.e., are "thermalized") and are deflected towards the neutron detectors 20 and 30 due to collisions or interactions with nuclei in the formation 60.

The detectors 20 and 30 detect some (depending on each detector's efficiency) of the neutrons with lower (thermal) energy deflected towards the detectors. A ratio of the counting rates (i.e., number of detected neutrons/time) in the two detectors 20 and 30 is directly related to the porosity of the formation 60.

The probability of an interaction of a neutron and a nucleus (i.e., a nuclear reaction) can be described by a cross-section of the interaction (i.e., reaction). A detector's efficiency is proportional with the probability of an interaction occurring when a neutron enters the detector's volume. The neutron detectors are built based on the large probability (i.e., cross-section) of a thermal neutron being captured (i.e., interact/react) with one of the three nuclei: helium ($^3$He), lithium ($^6$Li) or boron ($^{10}$B). Other particles such as, the $\alpha$ particle ($_2^4\alpha$) and the proton ($_1^1$p) result from the reaction of the thermal neutron with these elements. A calculable amount of energy (Q) is emitted as a result of the neutron capture reaction. This emitted energy may be kinetic energy of the resulting particles or gamma rays. The energy is dissipated by ionization, that is, formation of pairs of electron and positively charged particle. These pairs can be collected, for example, in an electrical field, and, thus, generate a signal recognizable as a signature of the neutron capture reaction. The larger is the emitted energy, the larger is the amplitude of the signature signal.

Some other particles besides the targeted neutrons (e.g., gamma rays) may cross the detector and be detected simultaneously. A good detector should exhibit characteristics that would allow discrimination between capture of a thermal neutron and other untargeted nuclear reactions that may occur. To facilitate discrimination between a neutron capture reaction and a gamma ray, the energy emitted in the neutron capture reaction (Q) should be as high as possible.

The three most common neutron capture reactions used for neutron detection are illustrated in Table 1:

TABLE 1

| Name | Reaction | Q (MeV) | Thermal neutron cross section (barns) |
|---|---|---|---|
| $^{10}$B(n, $\alpha$) | $_5^{10}$B + $_0^1$n → $_3^7$Li + $_2^4\alpha$ | Ground 2.792 Excited 2.31 | 3840 |
| $^6$Li(n, $\alpha$) | $_3^6$Li + $_0^1$n → $_1^3$H + $_2^4\alpha$ | 4.78 | 940 |
| $^3$He(n, p) | $_2^3$He + $_0^1$n → $_1^3$H + $_1^1$p | 0.764 | 5330 |

In the above table, relative to the $^{10}$B(n, $\alpha$) reaction "Ground" means that the resulting $_3^7$Li is in a ground state and "Excited" means that the resulting $_3^7$Li is in the first excited state.

Traditionally, detectors based on $^3$He(n, p) reaction have been used in neutron porosity measurements performed in the oil and gas industry, due to their relatively low cost, ruggedness, good detection efficiency, and insensitivity to gamma rays (i.e., the cross section for an interaction of the gamma ray with $^3$He is very small). The detection efficiency of these $^3$He based detectors can be improved by using higher pressures of the $^3$He gas, but the use of higher pressures results in increasing the cost of the detectors and of the high voltage required to operate them, which adversely affects the associated detector electronics. Additionally, the critical worldwide shortage of $^3$He makes it necessary to develop alternate neutron detectors for neutron porosity measurements in the oil and gas industry.

Lithium-glass scintillation detectors are currently used in some logging tools. The detection efficiency of the detectors based on $^6$Li(n, $\alpha$) reaction depends on the amount of $^6$Li in the detector material. A common lithium-glass used for down-hole logging is GS20, which has an isotopic ratio of 95% $^6$Li and a total lithium composition of 6.6%. Although the cross section for an interaction of the gamma ray with $^6$Li is significant, the large amount of energy (Q) resulting from the $^6$Li(n, $\alpha$) reaction enables a reasonable discrimination from reactions induced by gamma rays. However, the poor energy resolution of lithium-glass detectors at room temperature diminishes further at temperatures as low as 150° C., rendering their use limited to relatively shallow wells. In the lithium-glass scintillation detectors, the lithium-glass is coupled to a photomultiplier tube (PMT) that introduces electronic noise at elevated temperatures and is mechanically fragile.

Downhole neutron-porosity measurements may be performed during or after the drilling of a well. Accordingly, tools come in two different conveyances, logging (or measuring) while drilling (LWD/MWD) and wireline. The principal difference between LWD and wireline systems is the service environment. LWD tools operate during the drilling process and are subjected to the high levels of vibration and shock generated by drilling through rock. Wireline tools are conveyed in and out of the borehole on a cable after drilling and do not experience the shock and vibration seen during drilling.

FIG. 2 is a transversal cross-section (which is perpendicular to the well axis) of a porosity measurement set-up using a conventional LWD tool 80. Inside the geological formation 82, a borehole 84 is drilled by a drill bit (not shown). During drilling, mud is circulated inside the well, to maintain a hydrostatic pressure to counter-balance the pressure of fluids coming out of the well, and to cool the drill bit while also carrying crushed or cut rock at the surface though the borehole 84. The tool 80 is configured such as not to interfere with the mud circulation, for example, by surrounding a mud channel 86. The clean mud is sent downhole through the mud channel 86 and carries the drilling debris up to the surface through the borehole 84.

The diameter of the tool 80 may be about 8 inch. Similar to FIG. 1, the tool 80 may include a "near" detector positioned at about 10 inches from a neutron source (not shown in FIG. 2, e.g. 10 in FIG. 1) and a "far" detector positioned at about 20 inches from the neutron source. The near and far detectors include one or more $^3$He tubes having a ¾ to 1 inch or more diameter and 2-4 inches length.

FIG. 2 is a transversal cross-section (perpendicular to the well direction) of a porosity measurement setup using a conventional tool, the cross-section cutting though either the "near" detectors or though the "far" detectors. In this case, the (near or far) detectors includes four $^3$He tubes 90. The $^3$He tubes 90 may be placed on a side closest to the formation 82, since capturing neutrons scattered from the formation 82 are of interest (rather than neutrons scattered by the mud flowing in the borehole 84 or the mud channel 86). The counting rates in the near and far detector may be corrected for the effect of neutrons scattered by the mud flowing in the borehole 84 or the mud channel 86. However, even when corrections are performed, asymmetrical measurements unavoidably introduce uncertainty and errors.

Accordingly, it would be desirable to provide neutron detectors having a good detection efficiency (i.e., large cross section for neutron capture), good discrimination relative to gamma rays, and can be used in the logging shock and vibration environment (e.g., during drilling) and at high temperatures (e.g., over 175° C.) and have a complete azimuth coverage that would enable taking into consideration more accurately the effect of neutrons scattered by the mud flowing in the borehole.

SUMMARY

According to one exemplary embodiment, a neutron porosity measurement device adapted to receive a neutron source configured to emit neutrons having a first energy includes a segmented semiconductor detector. The segmented semiconductor detector includes a plurality of semiconductor neutron detection cells configured to detect neutrons having a second energy smaller than the first energy. the cells are arranged in subsets located between a first distance and a second distance from the neutron source, each subset including semiconductor neutron detection cells surrounding an axis and being disposed in opposite sectors defined relative to the axis at substantially same distance from the neutron source. one or more of the neutron detection cells being configured to acquire data related to detected neutrons independently from one or more other of the neutron detected cells.

According to another exemplary embodiment, a neutron porosity measurement tool configured to receive a neutron source configured to emit neutrons having a first energy includes a segmented semiconductor detector, and a processing unit connected to the segmented semiconductor detector. The segmented semiconductor detector includes a plurality of semiconductor neutron detection cells configured to detect neutrons having a second energy smaller than the first energy, the cells being arranged in subsets located between a first distance and a second distance from the neutron source, each subset including semiconductor neutron detection cells surrounding an axis and being disposed in opposite sectors defined relative to the axis at substantially same distance from the neutron source. one or more of the neutron detection cells is configured to acquire data related to detected neutrons independently from one or more other of the neutron detection cells. Each of the cells has a semiconductor substrate, electrodes and electronics. The semiconductor substrate of the cell is doped to form a pn junction, and has microstructures of neutron reactive material formed to extend from a first surface inside the semiconductor substrate. The electrodes of the cell include one electrode which is in contact with the first surface of the semiconductor substrate, and another electrode, which is in contact with a second surface of the semiconductor substrate, the second surface being opposite to the first surface, the electrodes being configured to acquire electrical signals occurring when a neutron is captured inside the semiconductor substrate. The electronics of the cell is configured to process and count the electrical signals received from the electrodes. The processing unit is configured to evaluate a porosity value based on numbers of neutrons detected in the semiconductor neutron detector cells during a same time interval for all the cells and to perform borehole corrections based on the numbers of neutrons corresponding to semiconductor neutron detector cells of a same subset.

According to another exemplary embodiment, a method of manufacturing a neutron porosity measurement device configured to be used with a neutron source that emits neutrons having a first energy includes mounting inside a chassis a segmented semiconductor detector including a plurality of semiconductor neutron detection cells configured to detect neutrons having a second energy smaller than the first energy inside a chassis. the cells are arranged in subsets located between a first distance and a second distance from the neutron source, each subset including semiconductor neutron detection cells surrounding an axis and being disposed in opposite sectors defined relative to the axis at substantially same distance from the neutron source. The method further includes connecting the semiconductor neutron detection cells to a processing unit configured to evaluate a porosity value based on numbers of neutrons detected in the semiconductor neutron detector cells during a same time interval for all the cells, and to perform borehole corrections based on numbers corresponding to cells in the same subset. Here, each of the cells includes (1) a semiconductor substrate doped to form a pn junction, and having microstructures of neutron reactive material formed to extend from a first surface inside the semiconductor substrate, (2) electrodes, one of which is in contact with the first surface of the semiconductor substrate and another one of which is in contact with a second surface of the semiconductor substrate, the second surface being opposite to the first surface, the electrodes being configured to acquire electrical signals occurring when a neutron is captured inside the semiconductor substrate, and (3) electronics configured to process and count the electrical signals received from the electrodes.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of neutron detection tools used for measuring the porosity of soil formations in oil and gas industry. However, the embodiments to be discussed next are not limited to these systems, but may be applied to other systems that require neutron detection in the context of scarcity of $^3$He.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Recent development of semiconductor technology has made appealing replacing conventional $^3$He tubes and Lithium glass neutron detectors with silicon carbide neutron detectors. Description of structure and efficiency of silicon carbide neutron detectors are included in U.S. patent application Ser. No. 12/956,560, which is incorporated herewith in its entirety.

Figure 3:
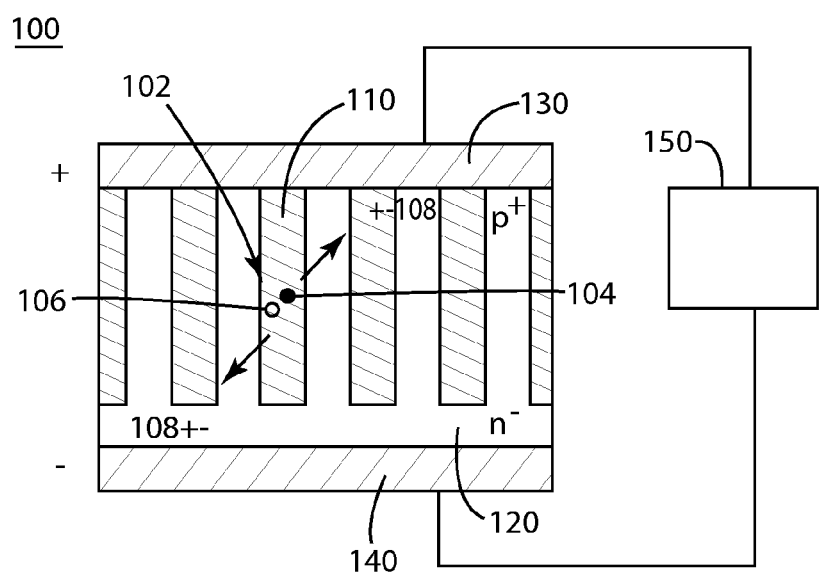
FIG. 3 is a schematic diagram of a neutron semiconductor detector cell.

FIG. 3 is a schematic diagram of a neutron semiconductor detector cell 100. An incoming thermal neutron 102 interacts with a $^6$Li or a $^{10}$B nucleus 104 of neutron reactive material 110 intertwined as pillars or trenches with semiconductor material 120 (e.g., SiC). An α-particle 106 and the recoiled nucleus 104 resulting from the interaction generates pairs 108 of free electrons and missing electron holes (behaving like free positively charged particles) in the semiconductor 120. The electrons and the holes migrate to the top or the bottom of the structure due to an electric field in the semiconductor pn junction (i.e., the upper area of the semiconductor 120 is doped with p+ impurities while the bottom part with n− impurities). The electrons and holes accelerated by the electric field (which may be amplified by applying an electrical potential difference via electrodes 130 and 140) may produce secondary pairs of electrons and holes. An electric signal resulting from collecting the electron and holes at the electrodes 130 and 140 (which may be made of gold) is an indicator of a captured neutron. The electrical signals may be processed and a number of signals in a predetermined time may be counted in an electronics unit (150).

The simulations (described in U.S. patent application Ser. No. 12/956,560 whose disclosure is incorporated herewith by reference) revealed that neutron semiconductor detectors with $^{10}$B as reactive material have a higher efficiency than the ones with $^6$Li (LiF is used for the electrodeposition of lithium on the SiC substrate, neutron detection is accomplished by using the nuclear reaction) as reactive material, for the same dimensions. This is an expected result since the neutron capture cross-section of $^{10}$B is larger than the one of $^6$Li.

Further simulations for pillars of neutron reactive material having various depths in the semiconductor material, i.e., between 50 μm and 200 μm for a step of 50 μm, revealed that (i) at 200 μm depth of the pillars, the efficiency of the SiC$^6$Li detectors becomes comparable with the helium tube efficiency, and for depths of the pillars over 130 μm the SiC$^{10}$B detectors efficiency becomes larger than the lithium-glass efficiency.

The simulations also allowed an evaluation of the ratio of the counting rates of the near and far detectors for the SiC$^{10}$B detector, the SiC$^6$Li detector, and the helium tube as functions of the porosity of the formation, revealing that the sensitivity of the porosity measurement is larger when using the neutron semiconductor detectors than when using the helium tubes. Thus, the neutron semiconductor detectors can be built to match and exceed the detection performance (efficiency and sensitivity) of currently used detectors (with $^3$He and lithium-glass). Additionally, the neutron semiconductor detectors can operate reliably at temperatures up to 250° C. and higher.

Figure 4:
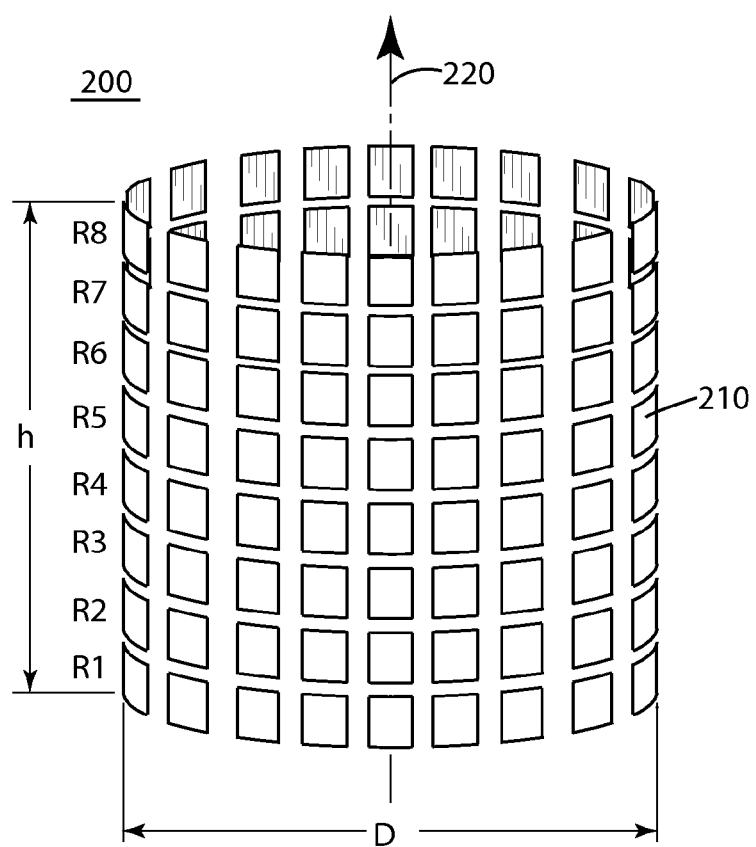
FIG. 4 is a schematic diagram of a segmented neutron detector according to an exemplary embodiment.

Different from neutron porosity measurement devices described in the U.S. patent application Ser. No. 12/956,560, where a near semiconductor detector and a far semiconductor detector replace the conventional helium or lithium glass neutron detectors, one feature of some embodiments is using an azimuthal and axial segmented semiconductor neutron detector. As illustrated in FIG. 4, a segmented neutron detector 200 includes a plurality of detection cells 210 made of SiC$^{10}$B or SiC$^6$Li neutron detectors arranged to surround a central axis 220, in a plurality of subsets (e.g., R1-R8) located at increasing distances from the source. The detection cells in each subset are arranged to cover a first sector as defined from the axis 220, which first sector may be positioned during a measurement in close proximity of the formation, and a second sector as defined from the axis 220, which second sector is opposite to the first sector. Presence of multiple detection cells in each subset enables more accurate borehole corrections (e.g., for mud weight, borehole size, pressure and temperature, etc.) of data acquired by the detection cells (e.g., counting rates or total numbers of detected neutrons in a time period). The segmented neutron detector 200 is an embodiment in which the detection cells 210 (1) appear to be of equal size, (2) are symmetrically arranged around the axis 220 to form a cylindrical shape, and (3) exhibit also a vertical alignment (i.e., cells in different subsets are arranged as a vertical column). However, embodiments of the segmented neutron detector are not limited by these features.

A single detection cell 210 may have an area of about 1 cm$^2$ and a thickness of 100-150 μm. The segmented neutron detector 200 may be configured to be used in a wireline or in a LWD porosity measurement device. In one embodiment, the segmented neutron detector 200 may have a diameter (D) of 1-8 inches and a length (h) (which is a difference between a first distance from the farthest subset of detection cells R8 to the neutron source and a second distance from the closest subset of detection cells R1 to the neutron source) of up to 30 inches.

Data acquisition (e.g., counting rate or number of detected neutrons per unit of time) from each of the detection cells 210 may be performed independently. As mentioned above, the processing of the data acquired from each subset of detection cells allows more accurate borehole corrections. The subsets of cells 210 may also be grouped as a first group corresponding to a "near" detector, and as a second group corresponding to a "far" detector. That is, the grouping is not fixed due to constructive features. For example, the cells in subsets R1-R3 may be considered to form a "near" detector and in subsets R4-R8 may be considered to form a "far" detector. Multiple porosity estimates may practically be extracted based on the same measurement using different groupings of the subsets of cells. These porosity estimates may be combined to yield a porosity value having an uncertainty significantly smaller than when a single fixed or constructively defined grouping is used.

Moreover, by grouping the subsets of detection cells (R1-R8) in different manners, porosity measurements corresponding to different depths into the formation may be evaluated. That is, most of the neutrons detected by the subsets of detection cells closer to the neutron source correspond to a smaller penetration of the neutrons in the formation, while the neutrons detected by the subsets of detection cells farther to the neutron source include neutrons that penetrated deeper in the formation. Thus, for example, a first porosity measurement using R1 and R2 as a near detector and R3 and R4 as a far detector characterizes the formation closer to the borehole than a second porosity measurement using R5 and R6 as a near detector and R7 and R8 as a far detector.

In addition to evaluating the porosity, the data acquired by the detection cells may also be used to evaluate the hydrogen index which is a ratio of the hydrogen content in the formation and the hydrogen content of water. Relative to evaluating the hydrogen index, the segmented neutron detector provides the same advantages related to borehole corrections, flexible combinations and results corresponding to various penetration depths as in the case of the porosity evaluation.

Figure 5:
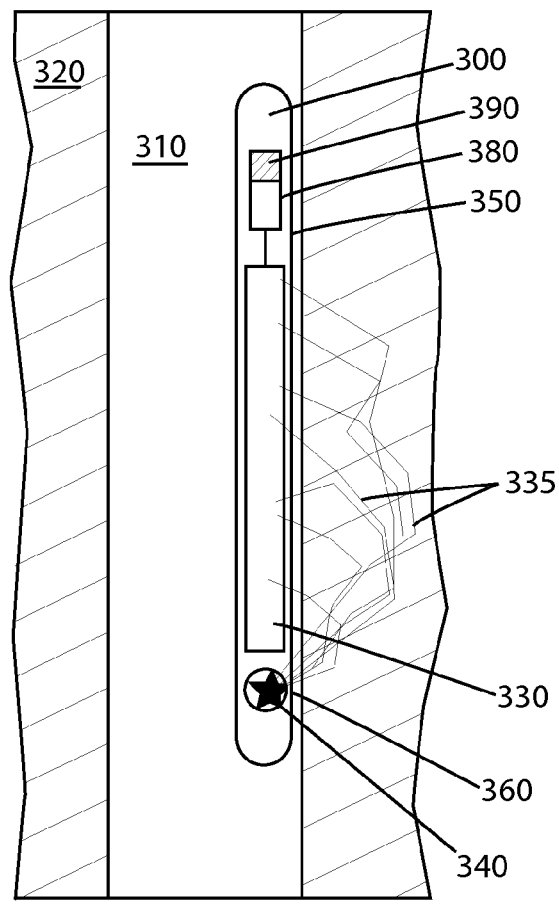
FIG. 5 is an axial cross-section of a down-hole porosity measurement set-up using a neutron semiconductor detector according to an exemplary embodiment.

FIG. 5 is an axial cross-section of a down-hole porosity measurement set-up using a neutron porosity measurement device 300 according to an exemplary embodiment. The neutron porosity measurement device 300 is lowered inside a borehole 310 to measure porosity of a geological formation 320. The neutron porosity measurement device 300 includes a segmented semiconductor neutron detector 330 (for example, similar with the one illustrated in FIG. 4) and a neutron source 340.

An average energy of neutrons emitted by the neutron source 340 is substantially larger than an average energy of neutrons detected in the detector 330. Fast neutrons, having for example energies larger than 1 MeV, are less likely to interact with nuclei due to neutrons' high speeds. Thermal neutrons having energies less than 0.1 eV after colliding with nuclei (see, e.g., neutron trajectories 335) are more likely to be captured by nuclei. Therefore, an average energy of neutrons emitted by the neutron source is substantially larger than an average energy of neutrons detected in the semiconductors and thus neutrons coming directly from the neutron source are unlikely to be detected.

The segmented semiconductor neutron detector 330 and the neutron source 340 may be placed inside a chassis 350. The neutron source 340 may be a chemical source such as AmBe or an electrical neutron generator. If the neutron source 340 is a chemical source, the neutron source 340 may be removed from the porosity measurement device 300 and stored in a radiation-shielded storage, while the device is not in use. The chassis 350 may have a cavity 360 configured to receive the neutron source 340.

Each of the detection cells of the segmented semiconductor neutron detector 330 may have associated electronics capable to operate at the same temperatures as the cells (e.g., up to 250° C.) and enabling acquiring and processing the signals produced due to neutrons captured in the cell. The cell electronics may also be configured to count a number of signals in a predetermined time period. The cell electronics may be located close to a respective cell or may be grouped in one or more electronics blocks.

The porosity measurement device 300 may also include a data processing unit 380 configured to process and/or transmit data and results related to the porosity measurement to a remote device via a wire 390 or wirelessly. If the neutron porosity measurement device 300 is an LWD device, porosity measurement related data may be sent at the surface through the mud (in a real-time mode). The data may also be recorded in a data storage device 390 (in a recording mode) to be recovered and processed after the device is brought back to the surface. Thus, the data processing and borehole corrections may be performed locally, by the data processing unit 380, or remotely based on data transmitted at the surface. Data processing and borehole correction may also be performed after data has been acquired based on raw and/or processed data stored in a memory locally or remotely.

Conventional porosity logging tools using $^3$He or Lithium-glass detectors require a high voltage power supply to be able to collect a signal when a neutron is captured. The high voltage power supply takes up a lot of space inside the conventional porosity logging tool and high power supply. In case of the neutron porosity measurement device 300, no power supply is necessary due to the pn junction's electric field (although the electric field may be amplified by applying a potential difference via the electrode but this enhancement does not imply a high power requirement). Since the neutron semiconductors detectors do not require a (high) power supply, the electronics is significantly smaller compared to that of a helium tube or the photomultiplier required with lithium-glass. If a chassis used for a conventional tool is used with neutron semiconductor detectors, the freed space may be filled with a neutron absorber (boron epoxy, for example) to better shield the neutron detectors from the neutron source through the tool, the mud channel or the borehole, and, thus, to lower the number of detected neutrons that do not travel through the formation. In other words, more shielding results in reducing noise of the measurement. Alternatively, the electronics being smaller allows the chassis to be smaller than the chassis used for a conventional tool.

Figure 1:
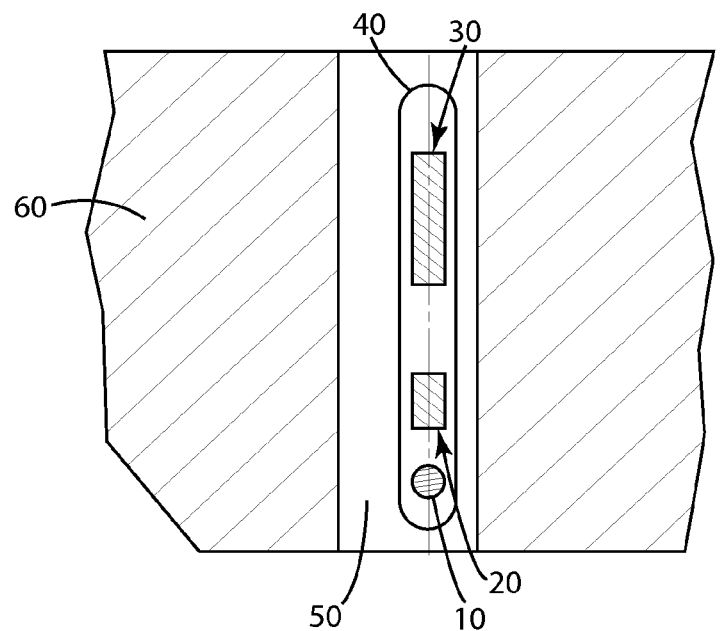
FIG. 1 is an axial cross-section of a conventional down-hole porosity measurement set-up.
Figure 2:
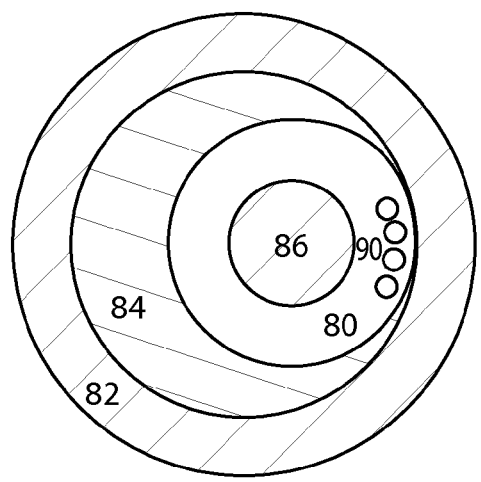
FIG. 2 is a transversal cross-section of a porosity measurement set-up using a conventional tool.
Figure 6:
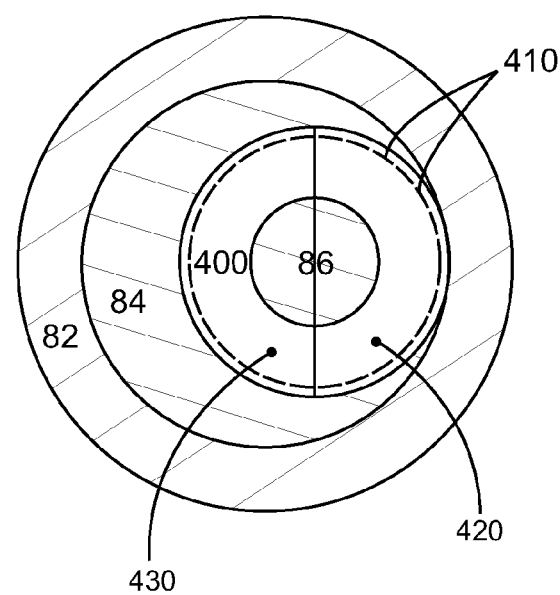
FIG. 6 is a transversal cross-section of a porosity measurement set-up using a neutron semiconductor detector according to another exemplary embodiment.

FIG. 6 is a transversal cross-section of a porosity measurement set-up using a neutron porosity measurement device 400 according to another exemplary embodiment. Similar to FIG. 2, FIG. 6 illustrates a LWD device configured to surround a mud channel 86, while lowered in a borehole 84 to measure porosity of formation 82. Silicon carbide cells 410 may correspond to one subset such as R1, R2, . . . , or Rn in FIG. 4, and are configured to acquire data independently. The cells 410 are circularly arranged thereby providing possibility to differentiate azimuthal measurements and therefore better correct for borehole effects in the porosity evaluation. The detection cells 410 are arranged to cover both a first sector 420 in close proximity of the formation 82 and a second sector 430 opposite to the first sector 420. The first sector 420 and the second sector 430 in FIG. 6 cover semicircles. However, design and data processing are not limited by the cell configuration illustrated in FIG. 6. If the diameter of the borehole is substantially larger than the diameter of the device, the first sector is preferably defined narrow, while if the diameter of the borehole is only slightly larger than the diameter of the device the first sector is preferably defined wide. Having cells arranged regularly around the axis allows flexibility of data processing relative to the manner of defining the first sector and the second sector.

Figure 7:
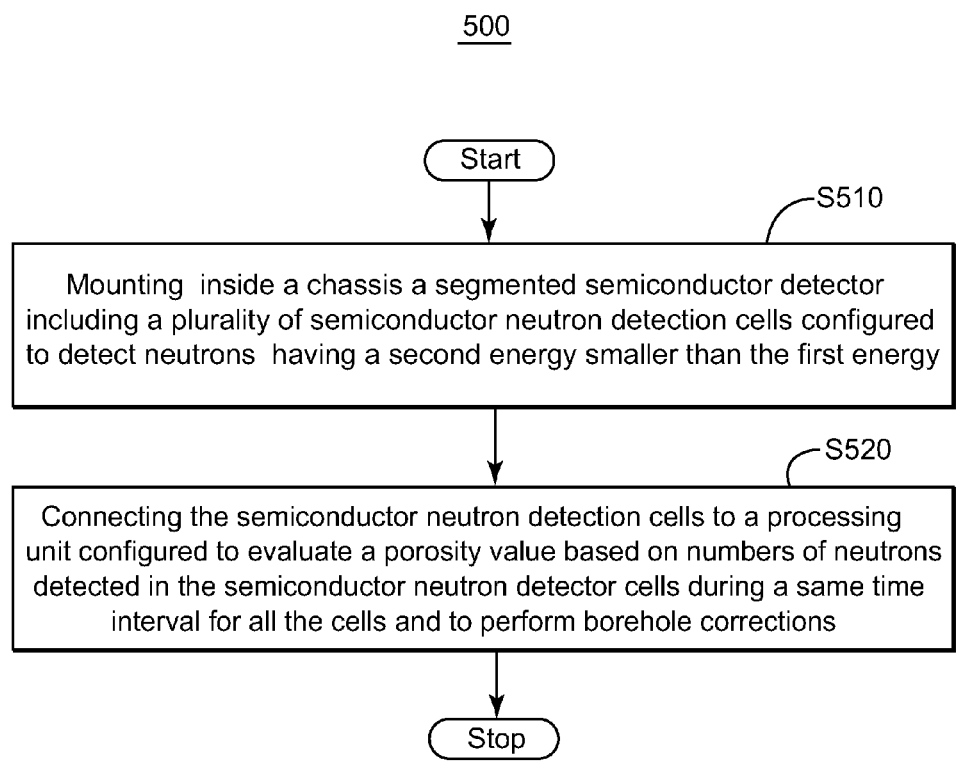
FIG. 7 is a flow chart of a method of manufacturing a neutron porosity measurement device using a segmented semiconductor neutron detector according to an exemplary embodiment.

A flow chart of a method 500 of manufacturing a neutron porosity measurement device is illustrated in FIG. 7. The method 500 includes mounting a neutron source configured to emit neutrons having a first energy and a segmented semiconductor detector (e.g., 200) including a plurality of semiconductor neutron detection cells configured to detect neutrons having a second energy smaller than the first energy inside a chassis, at S510. The method 500 further includes connecting the semiconductor neutron detection cells to a processing unit configured to evaluate a porosity value based on numbers of neutrons detected in the semiconductor neutron detector cells during a same time interval for all the cells.

The disclosed exemplary embodiments provide devices and methods related to porosity measurements using segmented neutron semiconductor detectors. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A neutron porosity measurement device adapted to receive a neutron source that emits neutrons having a first energy, the device comprising:
  a segmented semiconductor detector comprising a plurality of semiconductor neutron detection cells configured to detect neutrons having a second energy smaller than the first energy, the cells being arranged in subsets (R1-R8) located between a first distance and a second distance from the neutron source, each subset including semiconductor neutron detection cells surrounding an axis and being disposed in opposite sectors defined relative to the axis at substantially same distance from the neutron source,
  wherein one or more of the neutron detection cells are configured to acquire data related to detected neutrons independently from one or more other of the neutron detected cells.

2. The neutron porosity measurement device of claim 1, wherein each of the semiconductor neutron detection cell comprises:
  a semiconductor substrate doped to form a pn junction, and having microstructures of neutron reactive material formed to extend from a first surface inside the semiconductor substrate, and
  electrodes, one of which is in contact with the first surface of the semiconductor substrate and another one of which is in contact with a second surface of the semiconductor substrate, the second surface being opposite to the first surface, the electrodes being configured to acquire electrical signals occurring when a neutron is captured inside the semiconductor substrate.

3. The neutron porosity measurement device of claim 2, wherein the microstructure are trenches or pillars of the neutron reactive material.

4. The neutron porosity measurement device of claim 2, wherein the neutron reactive material comprises $^{10}$B or $^{6}$Li.

5. The neutron porosity measurement device of claim 2, wherein a thickness of the microstructures of neutron reactive material from the first surface inside the semiconductor substrate is between 50 μm and 200 μm.

6. The neutron porosity measurement device of claim 2, wherein the semiconductor substrate is silicon carbide.

7. The neutron porosity measurement device of claim 2, wherein each of the semiconductor neutron detection cells further comprises:
  electronics configured to process and count the electrical signals received from the electrodes.

8. The neutron porosity measurement device of claim 7, wherein the semiconductor neutron detection cells and the electronics are configured to operate at temperatures up to 250° C.

9. The neutron porosity measurement device of claim 7, wherein the electronics is configured to provide an electrical potential difference to the electrodes of a respective semiconductor neutron detection cell.

10. The neutron porosity measurement device of claim 1, further comprising:
  a processing unit configured to evaluate a porosity value of a formation outside the device based on numbers of neutrons detected in the semiconductor neutron detector cells during a same time interval for all the cells, the porosity value being based on at least one ratio of a first sum of numbers of neutrons detected in first semiconductor neutron detector cells and a second sum of numbers of neutrons detected in second semiconductor neutron detector cells which are located farther to the neutron source than the first semiconductor neutron detector cells.

11. The neutron porosity measurement device of claim 10, wherein the processing unit is further configured to evaluate a hydrogen index corresponding to the formation based on the numbers of neutrons detected in at least some of the semiconductor neutron detector cells.

12. The neutron porosity measurement device of claim 10, wherein the processing unit is further configured to correct for neutrons detected in the cells that are not recoiled from the formation by using data from cells in the same subset.

13. The neutron porosity measurement device of claim 10, further comprising at least one of:
  a memory configured to store data received from the semiconductor neutron detection cells and/or the processing unit; and a transmitter to transmit the data received from the semiconductor neutron detection cells and/or the processing unit.

14. The neutron porosity measurement device of claim 10, wherein the processing unit is configured to transmit data received from the neutron detection cells to a remote device.

15. The neutron porosity measurement device of claim 10, wherein:
the segmented semiconductor detector includes at least three subsets of cells, and
the processing unit is configured to evaluate at least two different porosity values by including different subsets in the first semiconductor neutron detector cells and in the second semiconductor neutron detector cells respectively.

16. The neutron porosity measurement device of claim 1, further comprising:
a chassis configured to encapsulate the neutron source and the segmented semiconductor detector.

17. The neutron porosity measurement device of claim 16, wherein the chassis has a cavity configured to receive a removable neutron chemical source or a permanent neutron generator device.

18. The neutron porosity measurement device of claim 1, wherein the neutron porosity measurement device is configured to be used while drilling and has a mud channel passing therethrough, the semiconductor neutron detection cells being arranged circularly between an inner wall neighboring the mud channel and an outer wall.

19. A neutron porosity measurement tool configured to receive a neutron source that emits neutrons having a first energy, the tool comprising:
a segmented semiconductor detector comprising a plurality of semiconductor neutron detection cells configured to detect neutrons having a second energy smaller than the first energy, the cells being arranged in subsets (R1-R8) located between a first distance and a second distance from the neutron source, each subset including semiconductor neutron detection cells surrounding an axis and being disposed in opposite sectors defined relative to the axis at substantially same distance from the neutron source, one or more of the neutron detection cells being configured to acquire data related to detected neutrons independently from one or more other of the neutron detected cells, each of the cells comprising
a semiconductor substrate doped to form a pn junction, and having microstructures of neutron reactive material formed to extend from a first surface inside the semiconductor substrate,
electrodes, one of which is in contact with the first surface of the semiconductor substrate and another one of which is in contact with a second surface of the semiconductor substrate, the second surface being opposite to the first surface, the electrodes being configured to acquire electrical signals occurring when a neutron is captured inside the semiconductor substrate, and
electronics configured to process and count the electrical signals received from the electrodes; and
a processing unit connected to the segmented semiconductor detector and configured to evaluate a porosity value based on numbers of neutrons detected in the semiconductor neutron detector cells during a same time interval for all the cells and to perform borehole corrections based on the numbers of neutrons corresponding to semiconductor neutron detector cells of a same subset.

20. A method of manufacturing a neutron porosity measurement device configured to be used with a neutron source that emits neutrons having a first energy, the method comprising:
mounting inside a chassis a segmented semiconductor detector comprising a plurality of semiconductor neutron detection cells configured to detect neutrons having a second energy smaller than the first energy, the cells being arranged in subsets (R1-R8) between a first distance and a second distance from the neutron source, each subset including semiconductor neutron detection cells surrounding an axis and being disposed in opposite sectors defined relative to the axis at substantially same distance from the neutron source; and
connecting the semiconductor neutron detection cells to a processing unit configured to evaluate a porosity value based on numbers of neutrons detected in the semiconductor neutron detector cells during a same time interval for all the cells, and to perform borehole corrections based on numbers corresponding to cells in the same subset, wherein each of the cells comprises
a semiconductor substrate doped to form a pn junction, and having microstructures of neutron reactive material formed to extend from a first surface inside the semiconductor substrate,
electrodes, one of which is in contact with the first surface of the semiconductor substrate and another one of which is in contact with a second surface of the semiconductor substrate, the second surface being opposite to the first surface, the electrodes being configured to acquire electrical signals occurring when a neutron is captured inside the semiconductor substrate, and
electronics configured to process and count the electrical signals received from the electrodes.

* * * * *